United States Patent [19]

Kubota

[11] Patent Number: 5,018,023
[45] Date of Patent: May 21, 1991

[54] IMAGE INPUT METHOD

[75] Inventor: Kazufumi Kubota, Kanagawa, Japan

[73] Assignee: Fuji Photo Film Co., Ltd., Kanagawa, Japan

[21] Appl. No.: 407,087

[22] Filed: Sep. 14, 1989

[30] Foreign Application Priority Data

Sep. 16, 1988 [JP] Japan .................. 63-231521

[51] Int. Cl.$^5$ .................. H04N 1/387; H04N 1/40
[52] U.S. Cl. .................. 358/450; 358/448; 358/443
[58] Field of Search .............. 358/401, 434, 437, 443, 358/447, 448, 450, 451, 453, 462, 479, 75, 80, 78

[56] References Cited

U.S. PATENT DOCUMENTS 4,485,409 11/1984 Schumacher .................. 358/479
4,673,988 6/1987 Jansson et al. .................. 358/479

Primary Examiner—Joseph A. Orsino
Assistant Examiner—Thomas D. Lee
Attorney, Agent, or Firm—Sughrue, Mion, Zinn, Macpeak & Seas

[57] ABSTRACT

A method of inputting an image of an original by inputting images of a plurality of divisions into which the original is divided, by the use of an image input device. By dividing the original and inputting the divisions separately, an image input device having relatively few pixels may be used. An image of a division of the original input by the image input device is displayed in an image scrolling area of a screen of a monitor and an image of part of another division adjacent to the division is displayed in an image fixing area of the screen adjacent to one side of the image scrolling area. The image displayed in the image scrolling area is scrolled so as to avoid discontinuity between the images displayed in both image areas by shifting one of the original and the image input device relative to the other. The data of the image displayed in the image scrolling area is stored in an image memory. The entire image of the original thus may be stored, and may be printed subsequently on photograhic paper.

5 Claims, 3 Drawing Sheets

IMAGE INPUT METHOD

BACKGROUND OF THE INVENTION

The present invention relates to an image input method that favorably is used in a video printer, and more particularly to a divisional image input method in which an image is input through an image input unit having a small number of pixels.

To input an image into, for example, a video printer, it has been known to use a TV camera or a scanner. Imaging sensors of such image input devices have a limited number of pixels available, and accordingly it is difficult to pick up a large image all at once. In order to pick up all of the image, it has been necessary to sacrifice resolution.

SUMMARY OF THE INVENTION

In view of the foregoing, it is one object of the present invention to provide an image input method in which a large image may be picked up, despite having a relatively small number of pixels available to do so.

The above and other objects of the invention are achieved by a method of inputting a whole image of an original by dividing the original into a plurality of smaller images, and inputting the smaller images, in order, by the use of an image input device. In the inventive image input method, an image of one division of the original input by the image input device is displayed in an image scrolling area of a screen of a monitor, and an image of part of another division, adjacent to the division being displayed, is positioned in an image fixing area of the screen in such a way that the image of the another division is displayed adjacent to one side of the image scrolling area. The image displayed in the image scrolling area is scrolled so as to avoid discontinuity between the images displayed in both image areas by shifting one of the original and the image input device relative to the other.

Images of the respective divisions of the original are input and displayed in order of arrangement from the top line to the bottom, and from side to side. Data of the image of the first division is stored in an image memory at a corresponding address. When an image of a second division adjacent to the first division is input and displayed in the image scrolling area, the image of the first division is partly displayed as a reference image in the image fixing area adjacent to the image scrolling area. To avoid discontinuity between the displayed images of the first and second divisions, one of the original and the image input device is shifted relative to the other to scroll the image in the image scrolling area. After the scrolling of the image of the second division, data of the image of the second division is stored in the image memory at a corresponding address. In this way, data of images of all of the divisions of the original are stored as data of the original in the image memory.

The image scrolling area is defined at the center of the monitor screen, and an image fixing area is defined along one vertical side and/or one upper horizontal side of the image scrolling area. The data of the original are read out all at once from the image memory, and are displayed as one complete image of the original on another screen of, for example, a CRT for printing.

DETAILED DESCRIPTION OF THE PREFERRED EMBODIMENT

Figure 1:
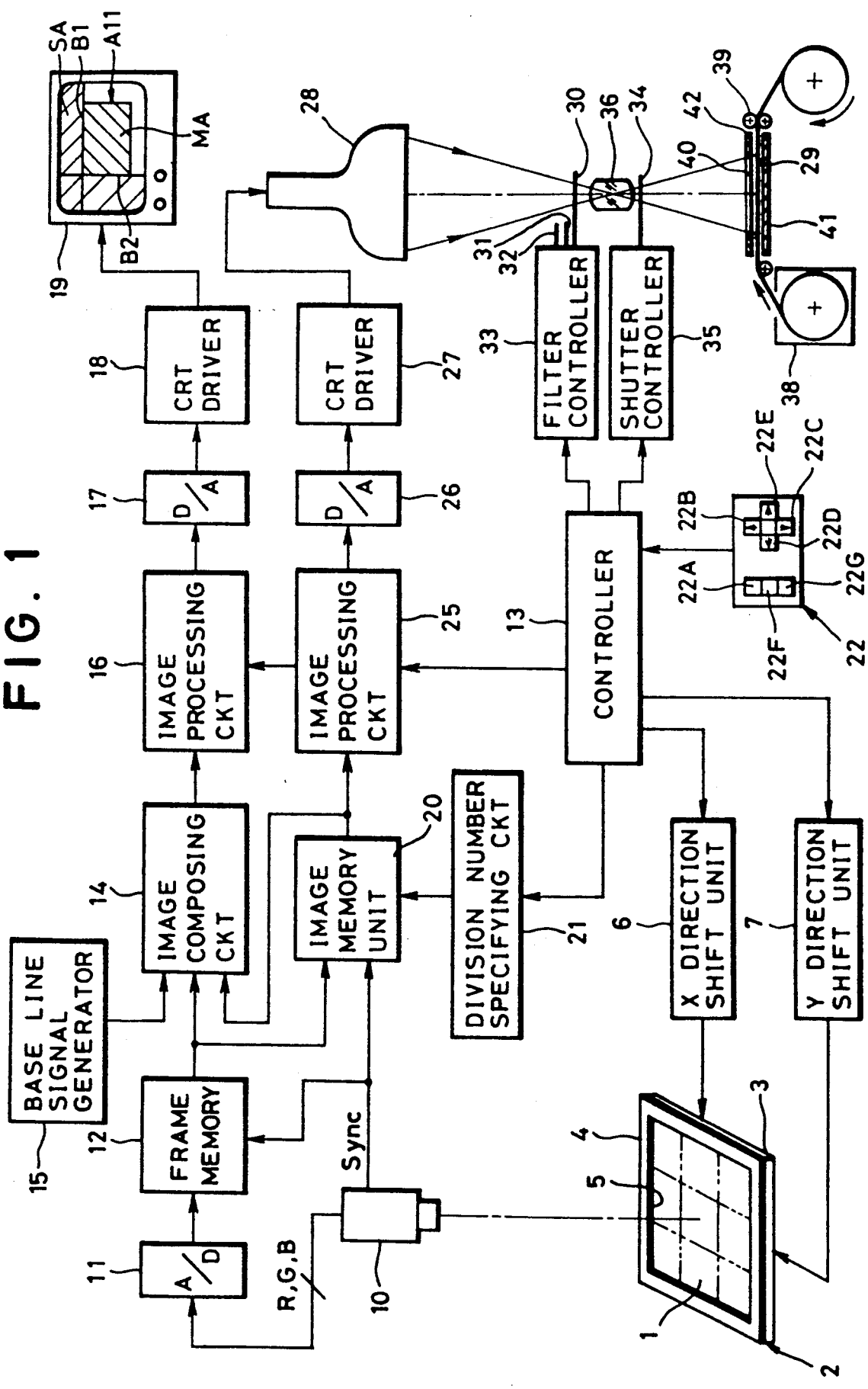
FIG. 1 is a schematic illustration, partly in block, showing a video printer having a side printing apparatus in accordance with a preferred embodiment of the present invention.

Referring to the drawings, and in particular to FIG. 1, an original such as a photographic print 1 from which a video print is made is placed on a table 2. The table 2 consists of a table base 3 and a pressing frame 4 hinged on the table base 3. The pressing frame 4 is formed with an opening 5 so as to expose the whole area of the photographic print 1. The table 2 cooperates with X and Y direction shift units 6 and 7 to shift the photo graphic print 1 in two dimensions. The X and Y direction shift units 6 and 7, which may be any well known type and thus need not be described in detail herein, are independently driven by respective pulse motors. The X and Y shift units 6 and 7 move the table 2 in a corresponding direction indicated by an arrow of a shift key 22B, 22C, 22D or 22E of a keyboard 22 when one of those keys is pushed.

Figure 2:
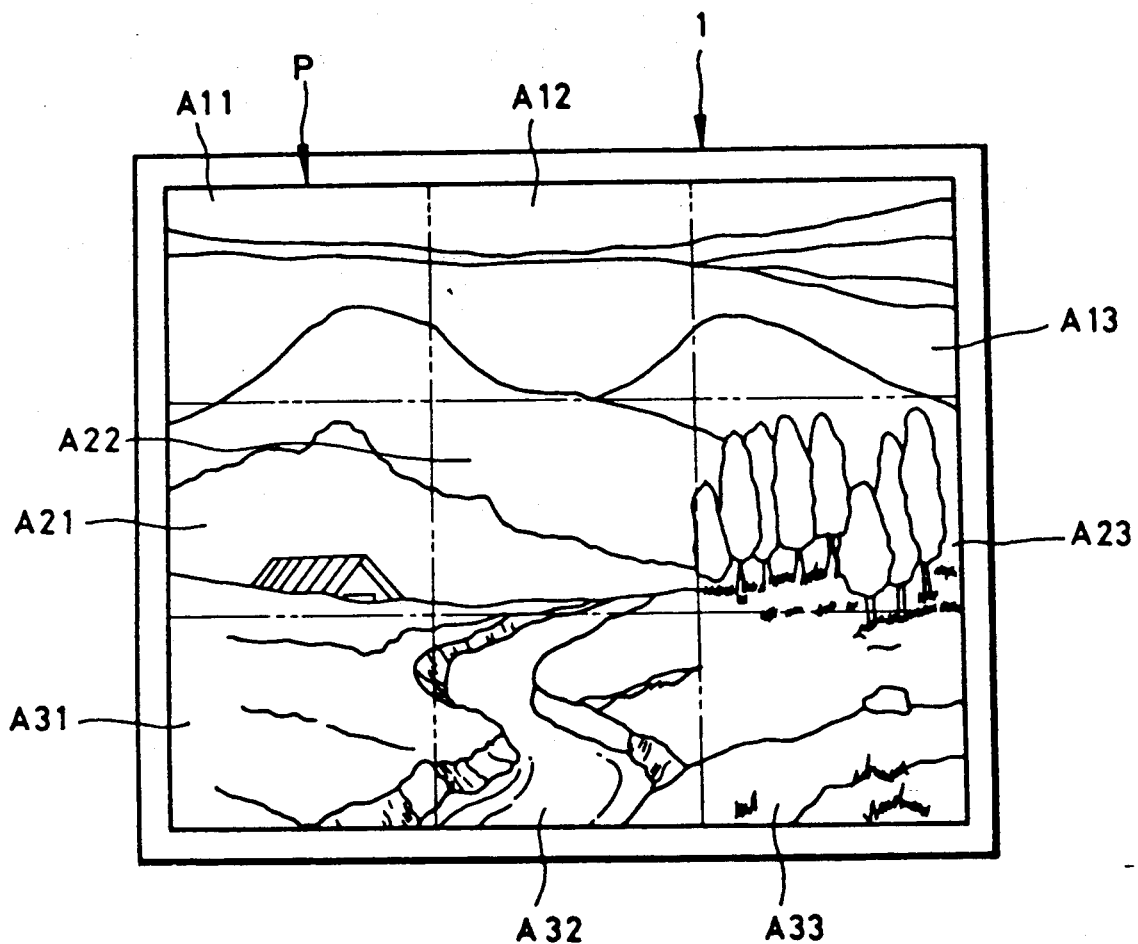
FIG. 2 shows an original which is nominally divided into a plurality of divisions for divisional image inputting.

Disposed above the table 2 is an image input device such as a TV camera 10 for inputting a positive image of the photographic print 1. The number of divisions into which the whole effective area of the photographic print 1 is to be divided depends on the number of pixels of an imaging device of the TV camera 10. For example, when inputting the whole area P of the photographic print 1 shown in FIG. 2, the whole effective area P is divided into nine divisions A11-A33 in a 3×3 matrix, and images of these divisions A11-A33 are input in order.

Red (R), green (G) and blue (B) video signals of an image of the division A11 input through the TV camera 10 are sent to an image composing circuit 14 through an A/D converter 11 and frame memories 12 provided for the three colors. The image composing circuit 14 composes the video signals and signals of X and Y base lines output from a base line signal generator 15. For this signal composition, a color monitor CRT 19 displays the image input through the TV camera 10 as a movable image and the X and Y base lines as a still image all together. Video signals of a composed image are sent to an image processing circuit 16 for gamma correction and gradation transformation, and if necessary, color balance correction and density correction.

Video signals processed in the image processing circuit 16 are converted from digital form to analog form by an D/A converter 17, and are sent to a driver 18 so as to display an image of the division A11 of the photographic print 1 and the X and Y base lines B1 and B2 on the color monitor CRT 19. The screen surface 19A (FIG. 3) of the color monitor CRT 19 is divided into two areas: an image scrolling area MA in which an image of a division now is input through the TV camera 10; and a bracket-shaped image fixing area SA consisting of an upper area and a left side area bordered by the X and Y base lines B1 and B2.

Red (R), green (G) and blue (B) video signals for all of the divisions A11-A33 from the frame memory 12 are sent to an image memory unit 20 and are stored therein. The image memory unit 20, which consists of a hard disk memory unit or a floppy disk unit, stores video signals at addresses specified for the respective divisions A11-A33 by a division specifying circuit 21. This video signal storage is performed by operating a freezing key 22A so that the controller 13 outputs a write signal.

Controller 13, which consists of a general use microcomputer, controls the X and Y direction shift units 6 and 7 to specify another division for image inputting by operating the freezing key 22A, as well as freezing processing. That is, the controller 13 moves the X and Y shift units 6 and 7 to shift the table 2 so a to locate the center of another division right below the TV camera 10. After locating that division, the controller 13 reads out video signals of divisions adjacent to the upper and left sides of that division from the image memory unit 20 and sends them to the image composing circuit 14 so as to display an image of the upper and left adjacent divisions in the bracket-shaped image fixing area SA of the color monitor CRT 19 that are used as a reference image to freeze the division.

Figure 3:
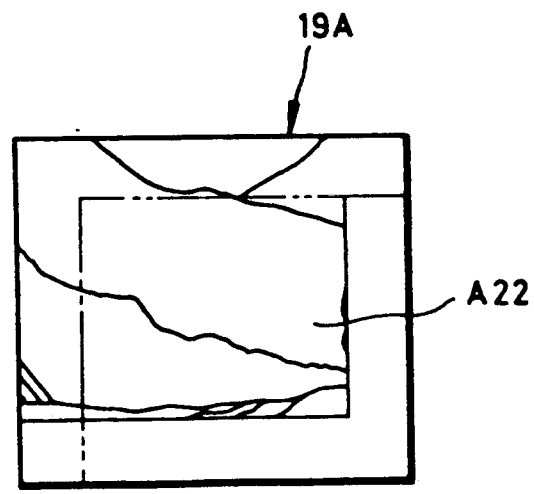
FIG. 3 shows a screen of a monitor on which an image of a division and part of an image of an adjacent division are displayed.

Image composing circuit 14 composes the image so as to display the video signals of the upper and left adjacent divisions read out from the image memory unit 20 as a still image in the bracket-shaped image fixing area SA of the color monitor CRT 19 and video signals of the division input through the TV camera 10 as a movable image in the image scrolling area MA of the color monitor CRT 19, all together as one, image. For example, when inputting an image of the division A22 in the second column of the second row, the color monitor CRT 19 displays an image of the division A22 and parts of images of the upper and left side adjacent divisions A12 and A21 in the image scrolling area MA and the bracket-shaped image fixing area SA of the screen 19A of the color monitor CRT 19, as shown in FIG. 3.

When displaying an image of any of the divisions A11, A12 and A13 in the first row, the X direction base line B1 is displayed in the horizontal part of the bracket-shaped image fixing area SA in place of an image of an upper side adjacent division. Similarly, when displaying an image of any of the divisions A11, A21 and A31 in the first column, the Y direction base line B2 is displayed in the vertical part of the bracket-shaped image fixing are SA in place of an image of a left side adjacent division.

While viewing a composed image of the screen 19A of the color monitor CRT 19, the shift keys 22B-22E are operated selectively so as to shift the table 2 in desired directions, thereby finely scrolling an image in the image scrolling area MA to avoid discontinuity between adjacent images. Then, the freezing key 22A is operated to freeze the image in the image scrolling area MA and store it in the image memory unit 20 at a specified address.

A printing system consists of an image processing circuit 25 for processing video signals from the image memory unit 20, D/A converter 26 connected to the image processing circuit 25, and a CRT driver for driving a black-and-white CRT 28 to display an image of the photographic print 1 thereon for exposure. The image processing circuit 25 performs gamma correction, gradation correction and/or positive-to-negative conversion, and if desired, color balance correction and density correction, all of which are carried out in a well known manner. After being image processed, the video signals are converted into an analog form from a digital form and then are sent to the CRT driver 27 to be displayed as a black-and-white image by color on the black-and-white CRT 28. A color paper 29 is exposed to the black-and-white CRT 28 so as to create a latent image of the photographic print 1 in a successive additive color printing.

To perform successive additive color printing, the black-and-white CRT 29 displays black-and-white images in a brightness pattern for three colors in order. While displaying a black-and-white image for one color, a corresponding one of color filters 30, 31, 32, is inserted independently of the other two by means of a filter controller 33. A shutter 34 is controlled by a shutter controller 35 so as to provide a proper exposure time. The same operation then is repeated for each of the other two colors.

Light passed through the color filters 30, 31, 32 is focused on the color paper 29 by means of a printing lens 36 disposed between the filters and the shutter. The color paper 29 is rolled in a paper magazine 38 and is withdrawn towards an exposure stage 40 right below the printing lens 36, one frame at a time, by a pair of feed rollers 39. Part of the color paper 29 placed in the exposure stage 40 is held flat between a pressure plate 41 and a mask plate 42.

Figure 4:
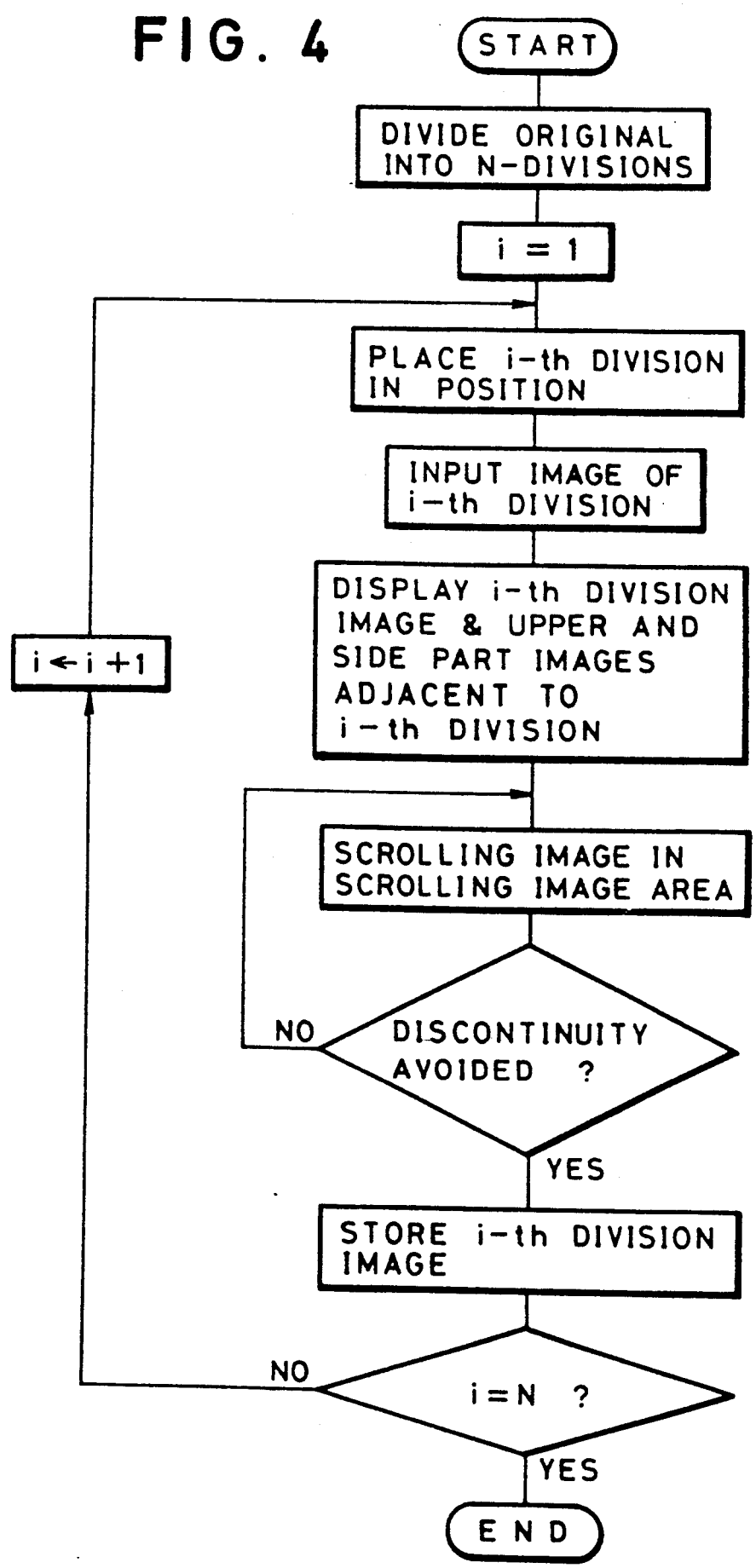
FIG. 4 is a flow chart illustrating a divisional image inputting procedure.

The sequential operation of the image input method in accordance with the present invention will be understood best with reference to a flow chart shown in FIG. 4. As shown, when divisionally inputting the whole image of the photographic print 1 divided into a 3×3 matrix, an image dividing key 22F of the keyboard 22 is operated to change the video printer into a divisional image input mode. Simultaneously, the controller 13 causes the X and Y direction shift units 6 and 7 to move the table 2 so as to place the table in an initial image input position where the center of a first division A11 in the first column of the first row is right below the TV camera 10 for the case in which divisional image input is performed in order from the left to the right column and from the top to the bottom row. Then, the TV camera 10 inputs an image of the first division A1 in the first column of the first row, and sends video signals of the image to the image composing circuit 14 through the A/D converter 11 and the frame memory 12.

In order to align edges of the respective divisions A11—A13 and A11—A31 in the top row and the left column, the base line signal generator 15 outputs to the image composing circuit 14 the signals needed to display the X and Y directional base lines B1 and B2. Consequently, the X and Y base lines B1 and B2 are displayed as a still image on the screen 19A of the color monitor CRT 19 and, on the other hand, the image of the first division A11 is displayed in the image scrolling area MA and the screen 19A of the color monitor CRT 19.

While viewing the screen 19A, the shift keys 22B-22E are operated to shift the table 2 so as to scroll the image of the first division A11 in the image scrolling area MA in a desired direction, up or down, or left or right until the upper and vertical edge lines of the image in the image scrolling area MA are mated to the X and Y direction base lines B1 and B2. When the image of the first division A11 in the image scrolling area MA has been aligned with the X and Y direction base lines B1 and B2 along its upper and side edge lines, the freezing key 22A is operated to freeze the image of the first division A11 and store it in the image memory unit 20 at a specified address.

As a result of the operation of the freezing key 22A, the controller 13 causes the X and Y shift units 6 and 7 to shift the table 2, thereby placing a second division A12 in the second column of the first row, right under the TV camera 10. Then, the controller 13 reads out video signals for the right side part of the image of the first division A11 from the image memory unit 20 that is adjacent to the second division A12 and sends them to th image composing circuit 14. Upon receiving video signals from the image composing circuit 14, the CRT driver 18 drives the color monitor CRT 19 to display an image of the right side part of the first division A11 in the vertical part of the still image display area SA and an image of the second division A12 input by the TV camera 10 in the image scrolling area MA.

While viewing the screen 19A, the shift keys 22B-22E are operated to shift the table 2 so as to scroll the image of the second division A12 in the image scrolling area MA in a desired direction in the same manner as for the image of the first division A11. When the image of the second division A12 in the image scrolling area MA has been aligned with the X direction base line B1 along its upper edge and has been aligned with the vertical side edges of the images of the first and second divisions A11 and A12, the freezing key 22A is operated to freeze the image of the second division A12 and store it in the image memory unit 20 at a specified address.

The same operation as for the first division A11 and the second division A12 is repeated for the following divisions A13-A33 of the effective area P of the photographic print 1 so as to store them in the image memory unit 20. In this manner, the effective area P of the photographic print 1 is input divisionally by a limited number of pixels of the imaging unit of the TV camera 10 and stored in the image memory unit 20.

When a print of the whole original print is required, a print mode key 22G is operated to change the video printer into a printing mode. The video printer in the printing mode reads out video signals of the original print 1 and, based on the video signals, drives the black-and-white CRT 28 for successive additive color printing.

Although the above description has been directed to a divisional image inputting manner, it is possible to input the entire image of the original print 1 at once into the image memory unit 20 if it is not necessary to input an image divisionally. This is effected to change the image input device to a normal mode.

To input images of divisions A11-A33 of the original print 1, it will be apparent to those having ordinary skill in this technological field that the TV camera or, otherwise, both of the TV camera and the table 2 may be shifted in two dimensions instead of shifting only the table 2 either manually or automatically.

It also will be apparent to those having ordinary skill in this technological field that the black-and-white CRT 28 for printing may be replaced with a liquid crystal display device, a laser printer, an ink-jet printer or a thermal printer.

Although the present invention has been fully described by way of a preferred embodiment thereof with reference to the accompanying drawings, various changes and modifications, in addition to those described above, will be apparent to those skilled in the relevant technological field. Therefore, unless otherwise these changes and modifications depart from the scope and spirit of the present invention as defined in the appended claims, they should be construed as included therein.

What is claimed is:

1. A method of inputting an image of an original by inputting images of a plurality of divisions into which said original is divided, by the use of an image input device, said method comprising the following steps:

displaying an image of one of said divisions of said original input by said image input device in an image scrolling area of a screen of a monitor and displaying an image of part of another of said divisions adjacent to said one of said divisions as a fixed reference image in an image fixing area of said screen adjacent to one side of said image scrolling area, said another of said divisions having been stored in an image memory;

scrolling said image displayed in said image scrolling area so as to avoid discontinuity between said images displayed in said image scrolling and image fixing areas by shifting said original relative to said image input device; and storing data of said image displayed in said image scrolling area in said image memory.

2. A method as defined in claim 1, further comprising the step of forming said image fixing area on one vertical side of said image scrolling area.

3. A method as defined in claim 1, further comprising the step of forming said image fixing area on one horizontal side of said image scrolling area.

4. A method as defined in claim 1, further comprising the step of forming said image fixing area on each of one vertical and one horizontal side of said image scrolling area.

5. A method as defined in claim 1, further comprising the step of displaying a base line in said image fixing area when an image of a division having no other division adjacent thereto is displayed in said image scrolling area.

* * * * *